United States Patent [19]

Ebihara et al.

[11] Patent Number: 5,079,833
[45] Date of Patent: Jan. 14, 1992

[54] APPARATUS FOR ASSEMBLING SMALL NUMBERS OF A LARGE VARIETY OF DIFFERENT GOODS

[75] Inventors: Yasuhiro Ebihara, Fujisawa; Hiroyuki Sakaniwa, Kawasaki; Hiroshi Saito, Yokohama, all of Japan

[73] Assignee: Nissan Motor Co., Ltd., Japan

[21] Appl. No.: 329,231

[22] Filed: Mar. 27, 1989

[30] Foreign Application Priority Data

Mar. 28, 1988 [JP] Japan .................. 63-71777

[51] Int. Cl.⁵ .................................. B23P 19/04
[52] U.S. Cl. .............................. 29/818; 29/711
[58] Field of Search ............ 29/157 R, 157 T, 700, 29/711, 771, 809, 818; 414/4; 364/478; 901/8, 41

[56] References Cited

U.S. PATENT DOCUMENTS 4,656,713  4/1987  Rosa et al. ............... 29/157 R
4,712,295  12/1987  Peele et al. ............... 29/700

Primary Examiner—Timothy V. Eley
Assistant Examiner—Peter Dungba Vo
Attorney, Agent, or Firm—Lowe, Price, LeBlanc & Becker

[57] ABSTRACT

An apparatus for and a method of assembling small numbers of a large variety of different products are disclosed. In order to eliminate stock of parts and prevent error in assembling inappropriate part, a straight pipe or rod is subjected to bending to a desired curved shape, and set to a predetermined position to assemble with the other parts, and then assembled.

8 Claims, 13 Drawing Sheets

(a)

(b)

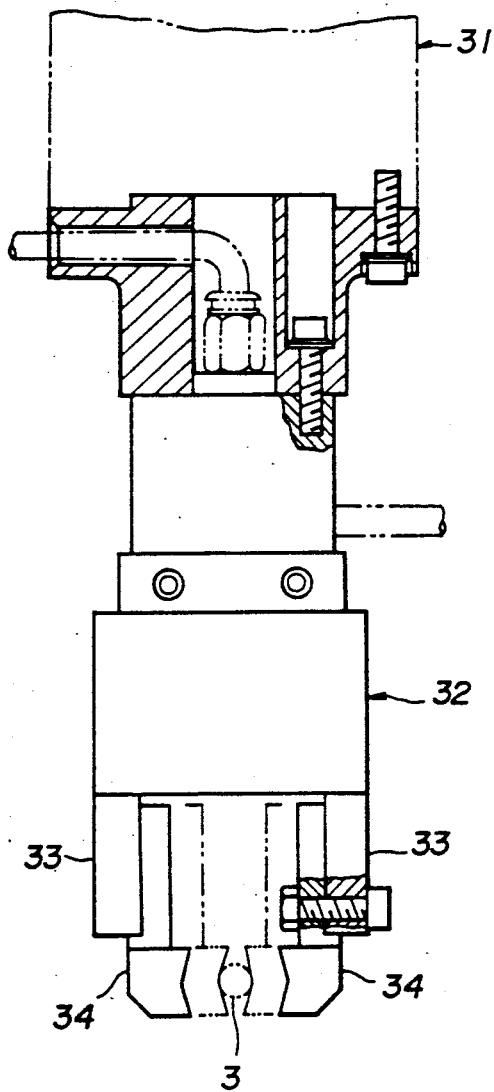
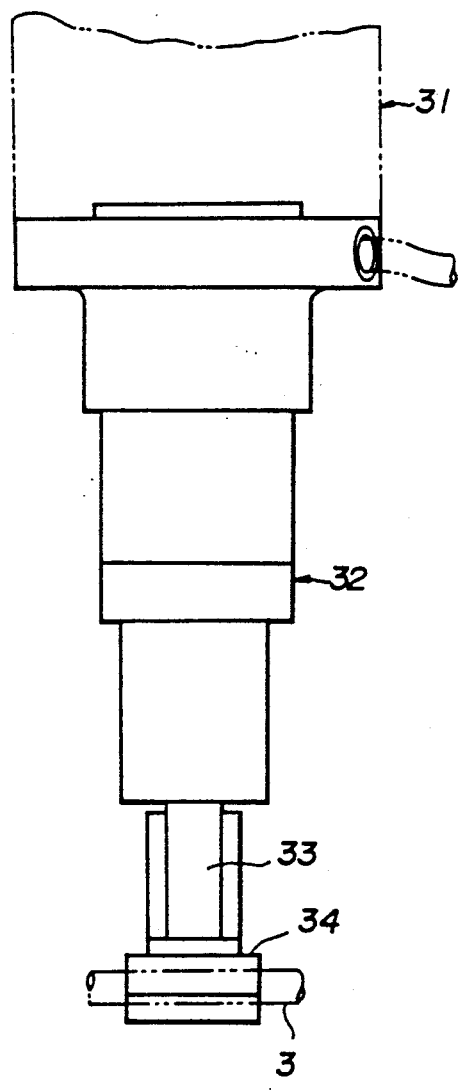
FIG. 3 (a)
FIG. 3 (b)

(a)

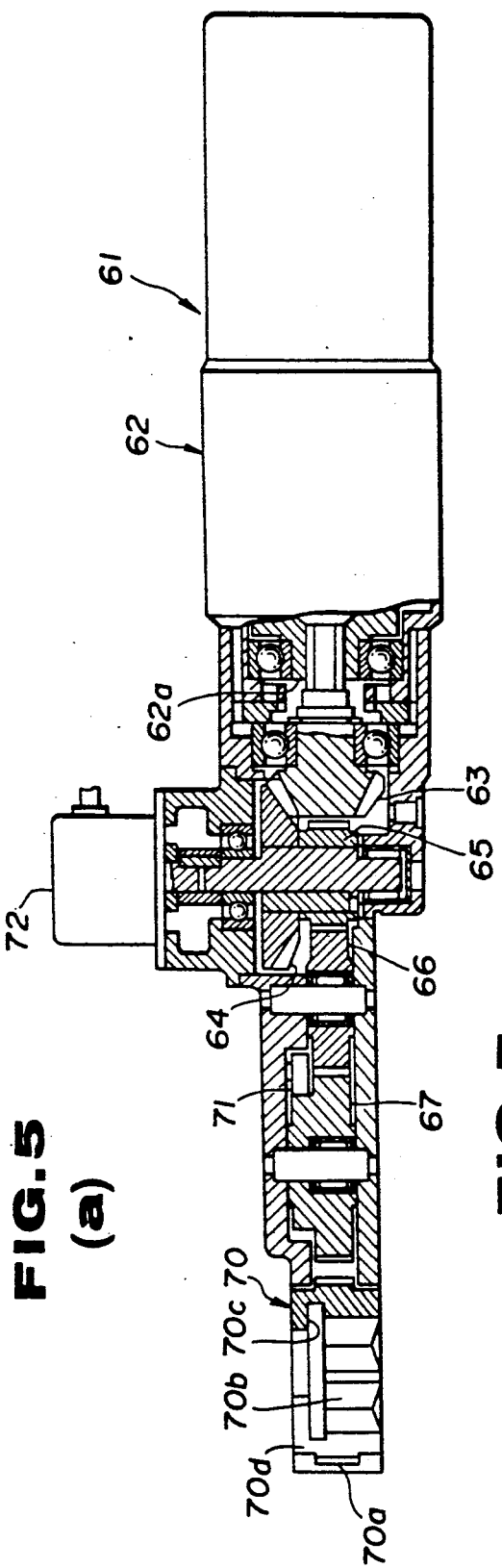
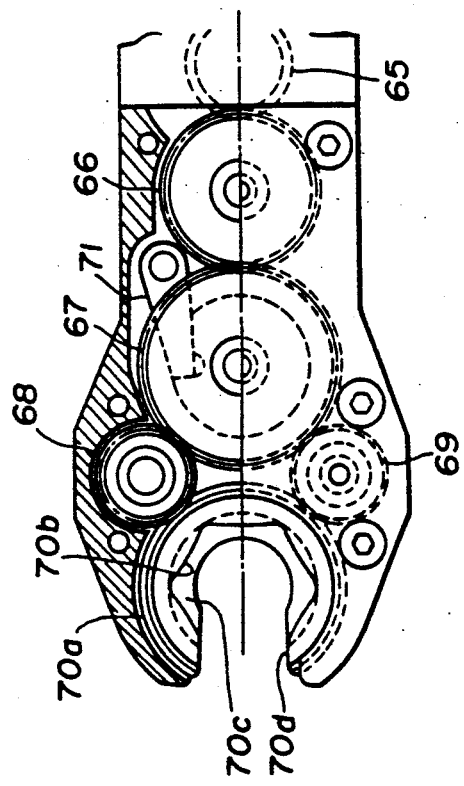
FIG.5 (a)
FIG.5 (b)

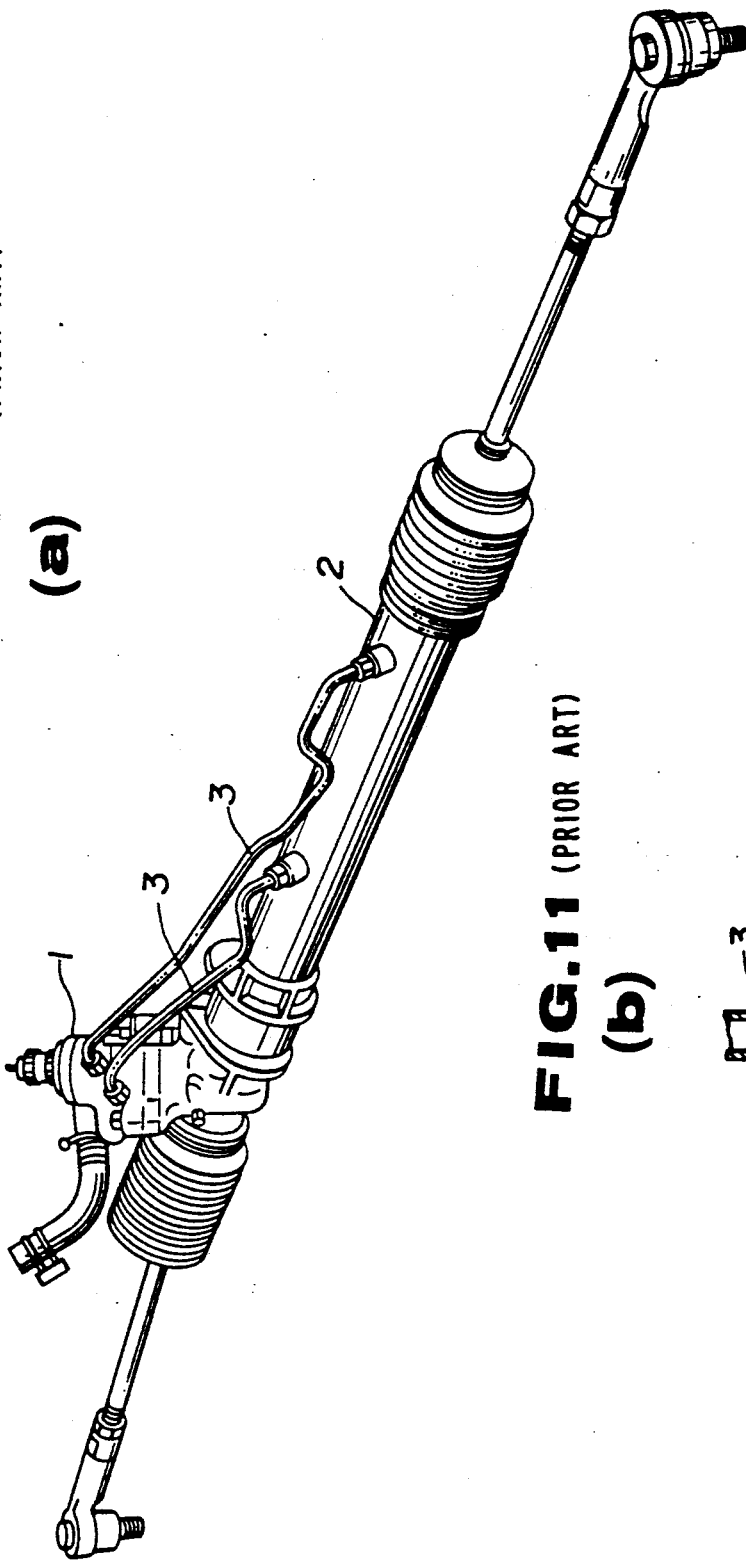
FIG.11 (PRIOR ART) (a)
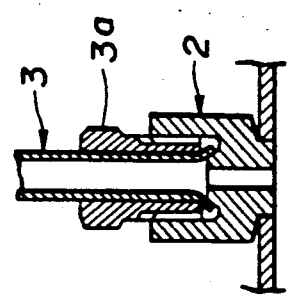
FIG.11 (PRIOR ART) (b)

APPARATUS FOR ASSEMBLING SMALL NUMBERS OF A LARGE VARIETY OF DIFFERENT GOODS

BACKGROUND OF THE INVENTION

The present invention relates to an apparatus for and a method of assembling small numbers of a large variety of goods, such as goods with curved elongated members like curved pipes or curved control rods.

Referring to FIG. 11(a), an automotive power steering gear assembly is described as a typical example of the items of the above kind. It comprises a gear housing 1 with an integral power cylinder 2, and curved pipes 3. Mounted within the gear housing 1 are a gear train of the rack and pinion type and a rotary valve. The curved pipes 3, which are formed by bending straight pipes, interconnect the gear housing 1 and the power cylinder 2 and serve as hydraulic fluid passages.

In the automobile assembly plants, small numbers of a large variety of automobiles are manufactured, and thus a large variety of different power steering gear assemblies are needed. Therefore, it has been the conventional practice to prepare a variety of different curved elongated pipes by bending straight pipes, each having flared ends with nuts 3a as shown in FIG. 11(b), and store a considerably large quantity of them at a suitable storage location for adequate supply to the assembly line. Upon receipt of production instructions including a product specification, an appropriate gear housing is connected to the corresponding power cylinder in accordance with the product specification. Then, an appropriate one of the curved pipes is selected at the storage location, held at a right position relative to the gear housing integral with the power cylinder, and secured thereto by tightening nuts at a predetermined torque.

Since small numbers of a large variety of different power steering gear assemblies are assembled and different curved pipes have to be prepared, a relatively large space is required at the storage location for the curved pipes.

Besides, the appropriate one of the different curved pipes is manually selected so that there is the possibility of human error in making the selection.

Accordingly, an object of the present invention is to provide an apparatus for and a method of assembling small number of a large variety of different products wherein the above-mentioned problems have been alleviated.

SUMMARY OF THE INVENTION

According to the present invention, there is provided an apparatus for assembling small numbers of a large variety of different products, comprising:

means for delivering a work piece to a predetermined position;

means for storing a variety of different straight elongated members;

means for selecting a predetermined straight elongated member out of said variety of different straight elongated members in accordance with a production instruction;

means for bending said predetermined straight elongated member in accordance with the production instruction to form a curved elongated member;

means for receiving said curved elongated member and holding the same in a predetermined position relative to said work piece; and means for mounting said curved elongated member to said work piece.

According to another aspect of the present invention, there is provided a method of assembling small numbers of a large variety of different products, comprising the steps of:

delivering a work piece to a predetermined position;

storing a variety of different straight elongated members;

selecting a predetermined straight elongated member out of said variety of different straight elongated members in accordance with a production instruction;

bending said predetermined straight elongated member in accordance with the production instruction to form a curved elongated member;

receiving said curved elongated member and holding the same in a predetermined position relative to said work piece; and mounting said curved elongated member to said work piece.

BRIEF DESCRIPTION OF THE DRAWINGS

FIG. 3(a) is a fragmentary front elevation, partly sectioned, of a pipe set robot which receives a curved pipe and holds the same relative to a work, and shows a hand of the robot;

FIG. 3(b) is a side elevation of the hand of the pipe set robot;

FIG. 5(a) is a longitudinal section of an open end air wrench;

FIG. 5(b) is a fragmentary view, partly sectioned, of the open end air wrench as viewed from the bottom in FIG. 5(a);

FIG. 11(a) is a perspective view of a power steering gear assembly discussed before as a typical example of products;

FIG. 11(b) is a section of a portion of the power steering gear assembly, showing connection between a flared end of the pipe and the power cylinder.

DETAILED DESCRIPTION OF THE INVENTION

Figure 1:
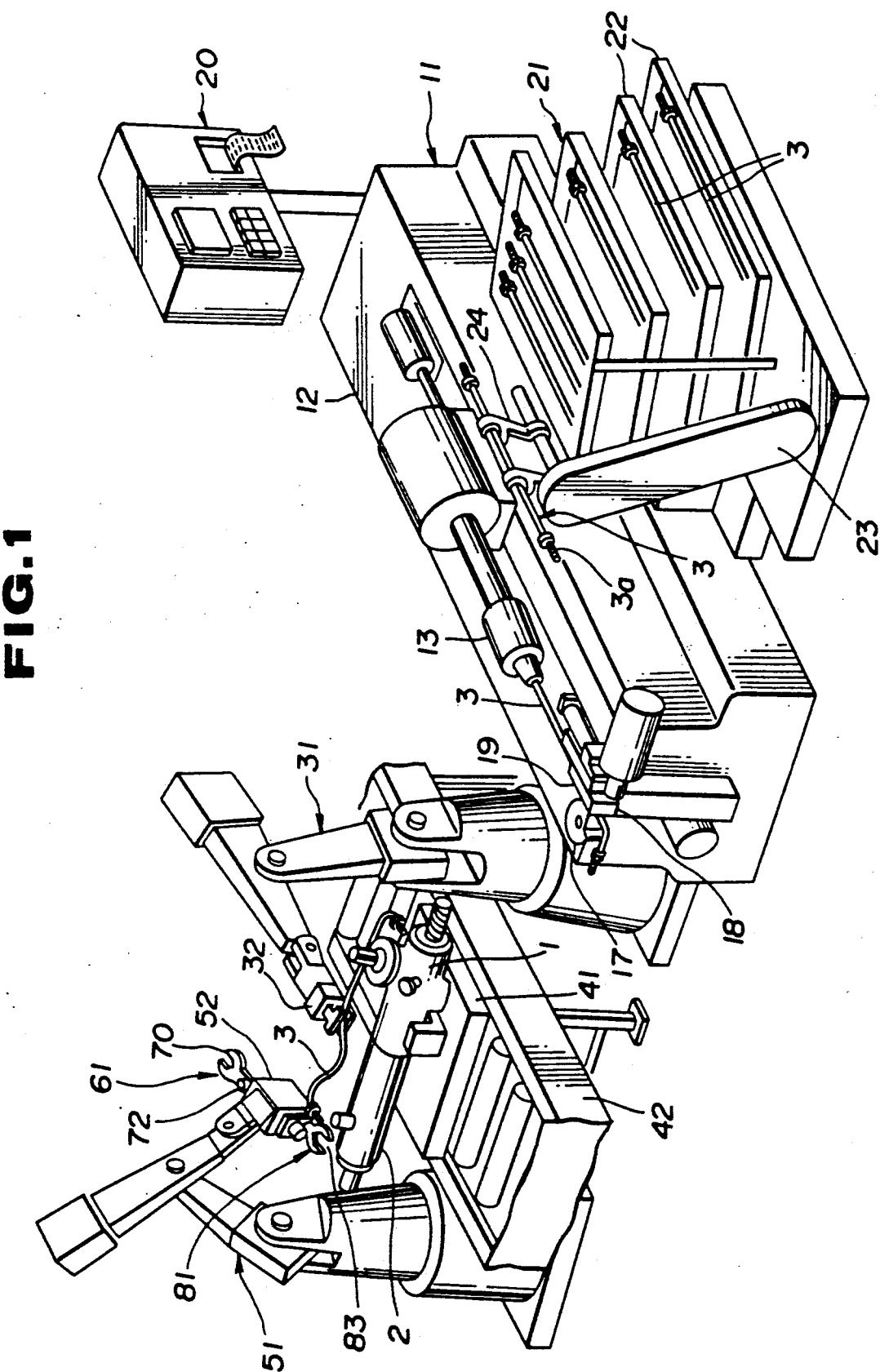
FIG. 1 is a perspective view of an apparatus according to the present invention which performs a method according to the present invention.

Referring to the accompanying drawings, and particularly to FIG. 1, an apparatus according to the present invention comprises a numerically controlled (NC) pipe bender 11, a pipe set robot 31, and a nut tightening robot 51.

Figure 2:
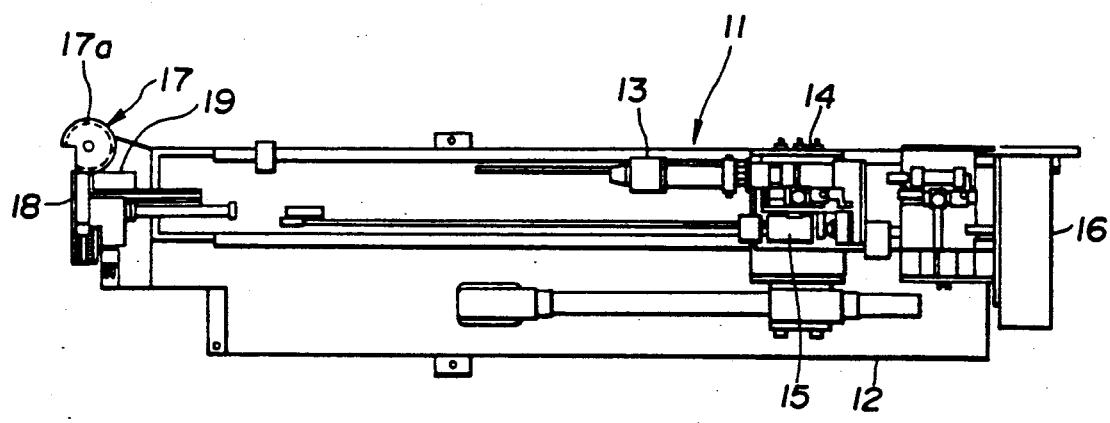
FIG. 2(a) is a top plan view of a pipe bender for bending an elongated pipe.
FIG. 2(b) is a side elevation of the pipe bender.
Figure 2:
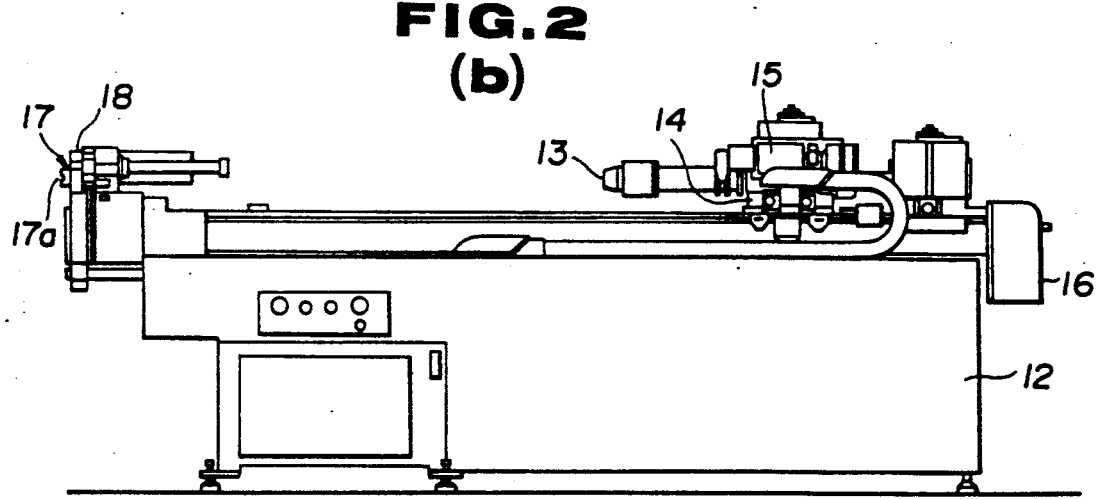

Referring to FIGS. 2(a) and 2(b), the NC pipe bender 11 comprises a slide table 12 with a mobile carrier 14 thereon. The mobile carrier 14 rotatably supports a chuck 13, and has mounted thereon a torque motor 15 for rotating the chuck 13. The mobile carrier 14 is guided in such a manner that it can slide in the longitudinal direction of the table 12 in response to rotation of a feed motor 16 mounted on the table 12 on the righthand end, as viewed in FIGS. 2(a) and 2(b).

Mounted on the lefthand end, as viewed in FIG. 2(a) and 2(b), of the table 12 are a bending roll 17 with an outer peripheral groove 17a having a semicircular cross sectional profile, and a clamp 18 with a semicircular groove opposed to the groove 17a of the bending roll 17. The bending roll 17 and the clamp 18 are rotatable by a drive mechanism, not shown, about an axis of rotation of the bending roll 17.

Also mounted on the lefthand end, as viewed in FIG. 2(a), is a pressure die 19 with a semicircular groove opposed to the groove 17a of the bending roll 17. The pressure die 19 is guided to move in the longitudinal direction of the table 12 and it is activated to move toward or away the bending roll 17.

Referring back to FIG. 1, this pipe bender 11 comprises a microcomputer based control unit 20, and a pipe loader 21. The control unit 20 controls actions of the above-mentioned mechanisms and the pipe loader 21 in accordance with instructions contained in control program stored in a memory of the microcomputer.

The pipe loader 21 comprises a chute 22 including four trays storing four different groups of straight pipes 3, respectively. Each of the pipes 3 has flared ends with flare nuts 3a thereon, see FIG. 11(b). Straight pipes 3 of four different lengths are prepared and divided into four groups and stored in different trays of the chute 22. The pipe loader 21 also comprises a chain conveyer 23, and a hand 24. Among all, an appropriate straight pipe 3 is selected and supplied to the chain conveyer 23 by means of a stopper mechanism, not shown. The conveyer 23 lifts the straight pipe 3 supplied up to a predetermined position where the hand 24 grips the pipe 3. After having gripped the pipe 3, the hand 24 brings it to a predetermined position above the slide table 12.

With the NC pipe bender 11, if the control unit 20 is instructed with the specification of a gear power steering gear assembly and the bending process of a pipe 3, the stopper mechanism of the pipe loader 21 supplies a straight pipe 3 having a length corresponding to the specification given to the chain conveyer 23 from the chute 22. The chain conveyer 23 delivers this pipe 3 to the hand 24. Then, the hand 24 holds this pipe 3 at the predetermined position above the slide table 24.

Thereafter, the chuck 13 moves toward the bending roll 17 to hold the adjacent end of the pipe 3, and further moves in the same direction until that portion of the pipe 3 which is to be subjected to the bending is disposed between the bending roll 17 and clamp 18.

Then, the clamp 18 moves toward the bending roll 17 until the pipe 3 is interposed between the groove of the clamp 18 and the outer peripheral groove 17a of the roll 17, while the pressure die 19 moves toward the bending roll 17 and it receives the pipe 3 in its groove to support the same. With this state being kept, the roll 17 and clamp 18 rotate, while the chuck 13 moves without any resistance in accordance with this rotation. In this process, the pressure die 19 holds the pipe 3 in the outer peripheral groove 17a of the bending roll 17 and thus the pipe 3 is bent to a predetermined curvature. The clamp 18 and pressure die 19 move back away from the bending roll 17, and the roll 17 and clamp 18 rotate back. Then, the chuck 13 moves towards the roll again until another portion of the pipe 3 which is to be subjected to the bending process is disposed between the bending roll 17 and clamp 18. During this movement, the chuck 13 may be turned through a predetermined angle if desired. Then, the above-mentioned bending process is repeated.

The straight pipe 3 has predetermined portion or portions bent to make a predetermined curved pipe corresponding to the specification given.

The pipe set robot 31 is disposed between a conveyer 42 and the NC pipe bender 11. A work piece, namely, an integral unit of a gear housing 1 integral with a power cylinder 2, is placed on a pallet 41. The pallet 41 is delivered by the conveyer 42 to a predetermined position relative to the pipe set robot 31. The pipe set robot 31 includes a hand 32 that is illustrated in FIGS. 3(a) and 3(b).

Referring to FIG. 3(a), the hand 32 has a pair of claws 33 with fingers 34, respectively. The claws 33 are movable toward each other by an air cylinder, not shown. The hand 32 therefore can hold the pipe 3 between the fingers 34 when the claws 33 are moved toward each other.

The pipe set robot 31 is controlled by a control unit, not shown. Upon completion of the bending process by the NC pipe bender 11, the above-mentioned hand 32 holds the curved pipe 3 and then the chuck 13 releases the pipe 3 and moves back to the waiting position. Then, the pipe set robot 21 moves the hand 32 with the curved pipe 3 interposed between the fingers 34 to a predetermined position relative to the gear housing 1 integral with the power cylinder 2, keeping it at this predetermined position.

Figure 4:
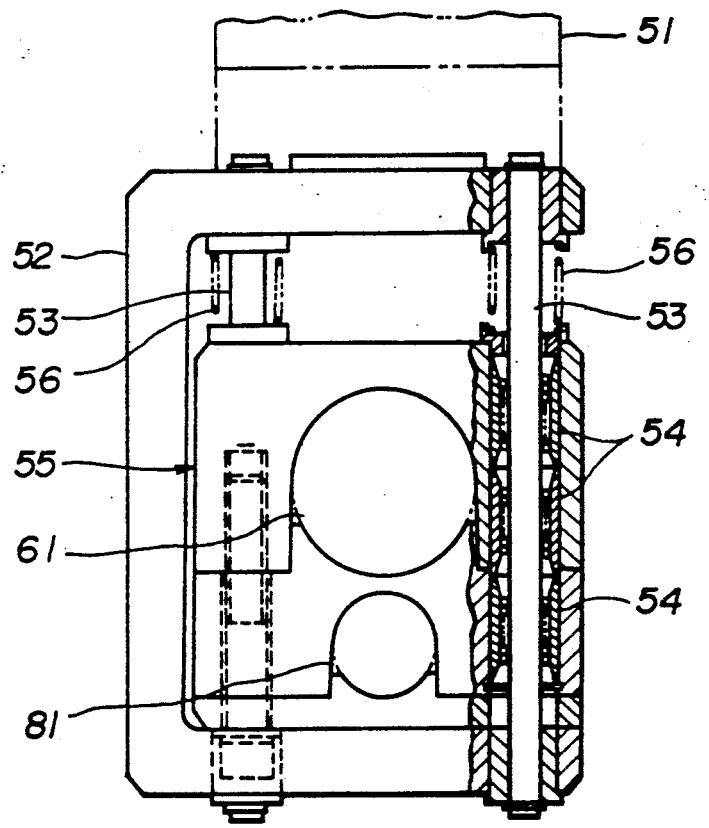
FIG. 4(a) is a fragmentary front elevation, partly sectioned, of a nut tightening robot and shows a hand of the nut tightening robot.
FIG. 4(b) is a side elevation of the hand of the nut tightening robot.
Figure 4:
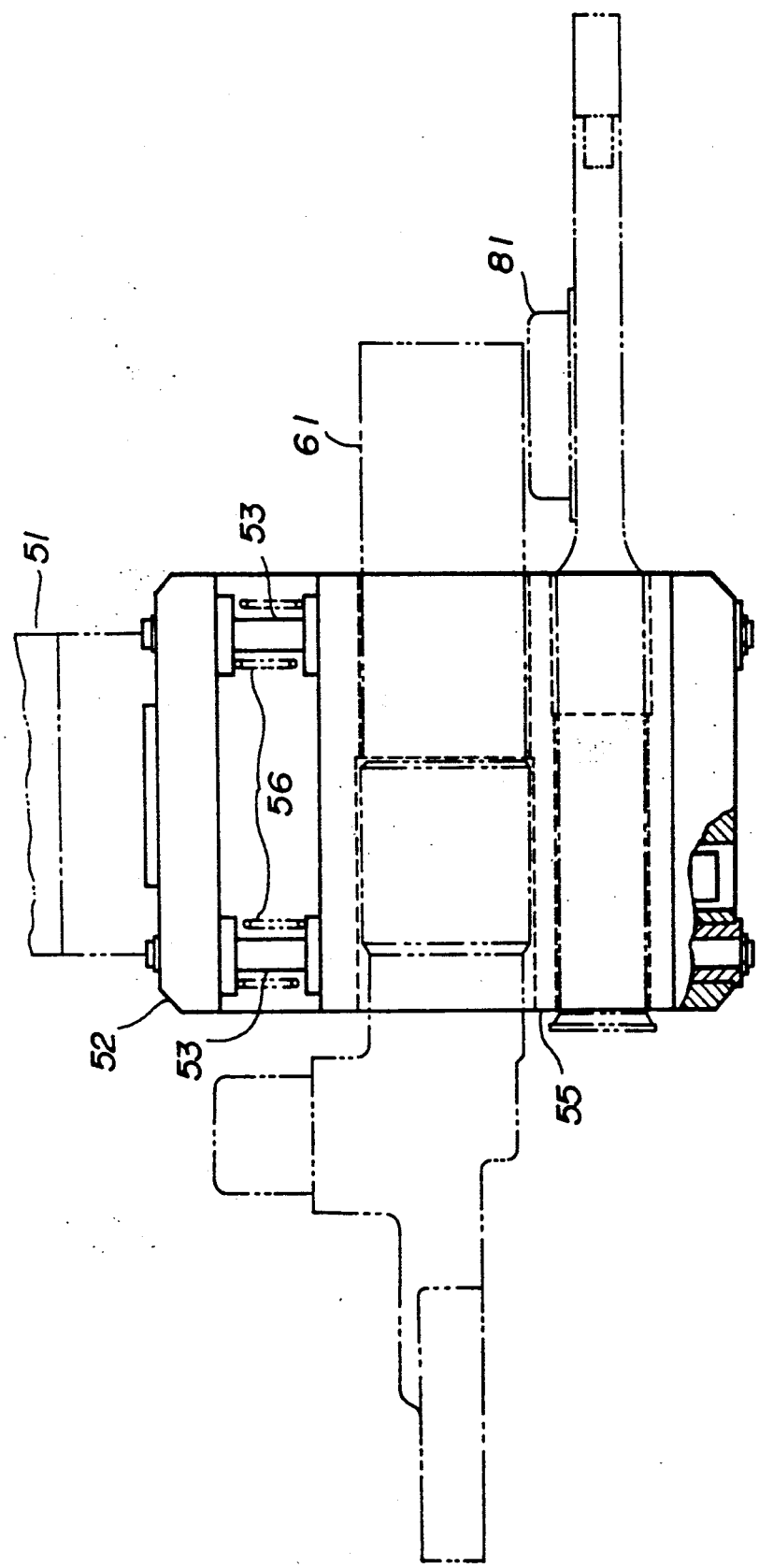

The nut tightening robot 51 is opposed to the pipe set robot 31 across the conveyer 42, and includes a generally C-shaped bracket 52, as a hand, as illustrated in FIGS. 4(a) and 4(b).

Referring to FIGS. 4(a) and 4(b), the bracket 52 has a clamp 55 slidably mounted thereon by four guide shafts 53 and a ball type bushing 54. Springs 56 are arranged between one arm of the bracket 52 and the clamp 55 to bias the clamp 55 downwadly, as viewed in FIG. 4(a). The guide shafts 53, bushing 54 and springs 56 constitute an equalizer.

As best seen in FIG. 4(b), the clamp 55 supports the open end air wrench 611 and the torque wrench 81 in such a manner that they extend in the opposite directions from the bracket 52.

Referring to FIG. 5(a), the open end air wrench 61 includes an air operated motor 62 with a reduction gear box. The output shaft 62a of the air motor 62 is fixedly coupled with a bevel gear 63 which meshes with another bevel gear 64 integral with a pinion 65. As best seen in FIG. 5(b), the pinion 65 meshes with a gear 66 which in turn meshes with a gear 67. The gear 67 meshes with two pinions 68 and 69 which in turn meshes with an external gear 70a formed around the outer periphery of a socket 70. The arrangement is such that if the pinion 65 rotates counterclockwise, as viewed in FIG. 5(b), the socket 70 rotates counterclockwise; and if it rotates clockwise, the socket 70 rotates clockwise. The socket 70 includes a hexagonal portion 70b and a bottom wall 70c, and it is formed with a cutout or opening 70d.

The open end air wrench 61 includes a ratchet 71 and a rotary encoder 72. The ratchet 71 is arranged such that when the socket 70 rotates in a direction opposite to a direction in which the nut is tightened, it engages with the gear 67 and stops this rotation of the socket 70 when socket 70 comes to a receptive position where the opening 70d faces to the left as viewed in FIG. 5(b). The rotary encoder 72 measures an angle of rotation of the bevel gear 64 and thus an angle of rotation of the socket 70.

With the open end air wrench 61, when air pressure is supplied to one port, the output shaft 62a rotates clockwise as viewed from the left in FIG. 5(a). This clockwise rotation of the output shaft 62a is transmitted via the gears 63 to 69 to the socket 70, causing the socket 70 to rotate in the nut tightening direction, namely in counterclockwise direction as viewed in FIG. 5(b). Since the output shaft 62a rotates continuously, the socket 70 rotates continuously in the nut tightening direction. When air pressure is supplied to the other port of the air motor 62, the output shaft 62a rotates in the opposite direction and thus the socket 70 tends to rotate in the opposite direction. Since the gears 67 and 70a are substantially identical to each other, the reverse rotation of the socket 70 is stopped at the central receptive position as illustrated in FIG. 5(b) because the ratchet 70 engages with the gear 67 before the gear 67 make a full turn during its reverse rotation.

Figure 6:
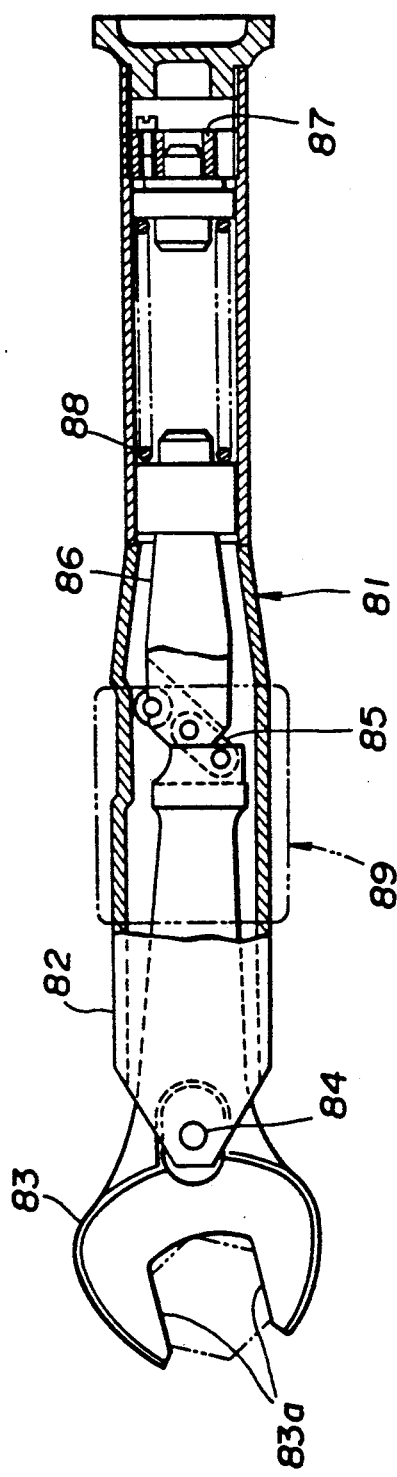
FIG. 6 is a plan view, partly sectioned, of a torque wrench.

Referring to FIG. 6, the torque wrench 81 includes a tube 82 with an open end, and a spanner-like head 83. The head 83 is formed with the opposed spaced parallel sides 83a and is pivotably mounted via a head pin 84 on the tube 82 at a portion adjacent the open end thereof. The spanner-like head 83 extends into the tube 82 has an inner end connected via an inclined link 85 to the adjacent end of a thruster 86 slidably disposed in the tube 82. The inclined link 85 is inclined relative to the axis of the tube 82. A spring 88 is operatively disposed between the thruster 86 and a thrust ring 87. The thrust ring 87 is threadedly engaged in the tube 82 and adjustable in axial direction relative to the tube 82. Mounted on the outer periphery of the tube 82 is a limit switch 89 which is so constructed and arranged as to detect rotation of the head 83 beyond a predetermined angle. With the nut interposed between the opposed two spaced parallel sides 83a, if the tube 82 is rotated about the central axis of the nut, a moment about the head pin 84 is imparted to the head 83, biasing the thruster 86 via the link 85. If the biasing force exceeds the preloaded pressure applied to the spring 88, the head 83 begins to rotate about the head pin 84, thus activating the limit switch 89.

Therefore, with this torque wrench 81, the limit switch 89 is activated to produce an output signal when the torque applied to the nut exceeds the predetermined torque. This predetermined torque is adjustable by adjusting the position of the thrust ring 87 to modulate the preloaded pressure of the spring 88.

Figure 7:
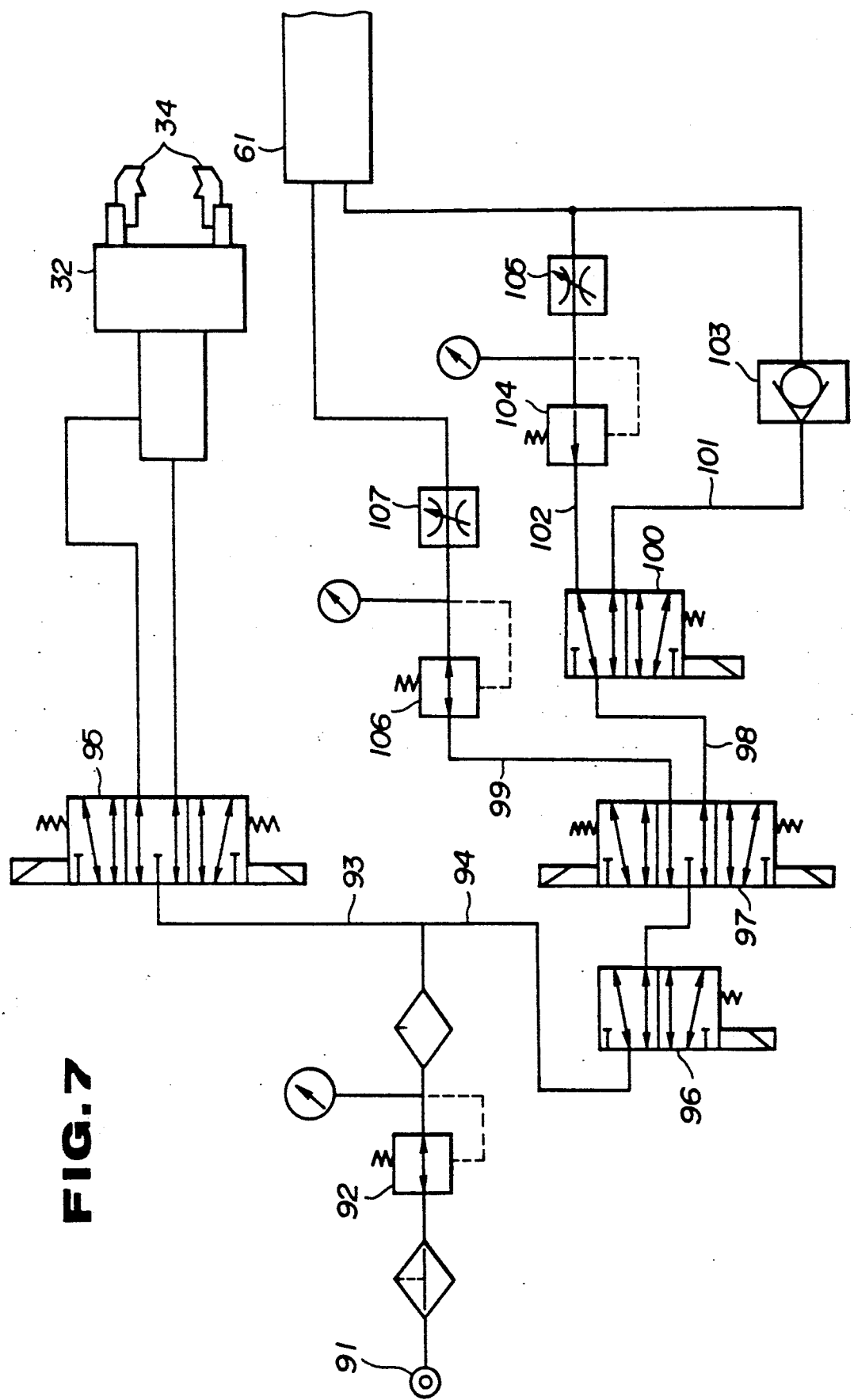
FIG. 7 is an air pressure circuit for activation of the hand of the pipe set robot and the open end air wrench.

The supply of air pressure to the air cylinder of the hand 32 and to the open end air wrench 61 is controlled by an air pressure circuit shown in FIG. 7.

This air pressure circuit comprises a source of air pressure 91, and a pressure reduction valve 92. The air pressure generated by the pressure reduction valve 92 is supplied on one hand to a solenoid operated selector valve 95 via a pressure line 93, and on the other hand to a solenoid operated selector valve 96 via a pressure line 94. The solenoid operated selector valve 95 is connected to both chambers of the air cylinder of the double action type of the hand 32, respectively, and it has five ports and three positions. The other solenoid operated selector valve 96, which has a function to acivate or stop the action of the open end air wrench, has five ports and two positions and it is connected to a solenoid operated selector valve 97. The solenoid operated selector valve 97 has five ports and three positions, and it has an outlet port connected to a pressure line 98 and other outlet port connected to a another pressure line 99. The pressure line 98 is connected to a solenoid operated selector valve 100 having five ports and two positions. The solenoid operated selector valve 100 has a function to select low speed rotation of air motor 62 or high speed rotation thereof, and it has an outlet port connected to an air pressure line 101 and another outlet port connected to an air pressure line 102. The air pressure line 101 is connected via a one-way check valve 103 to a port inducing positive rotation of the air motor 62 of the air wrench 61, while the another pressure line 102 is connected via a pressure reduction valve 104 and a thorttle valve 105 to a port inducting reverse rotation of the air motor 62 of the air wrench 61.

In this air pressure circuit, the pressure reduction valve 92 regulated air pressure discharged from the source of pressure 91 to generate a base pressure. This base pressure is delivered to the pressure lines 93 and 94. In response to the position taken by the solenoid operated selector valve 95, the base pressure is supplied selectively to one or the other chamber of the air cylinder of the hand 32, causing the fingers 34 to move toward each other or away from each other. If the solenoid operated selector valve 96 is activated, the supply of base pressure to the solenoid operated selector valve 97 is permitted or interrupted in response to the position taken by the solenoid operated selector valve 96. If the solenoid operated selector valve 97 is activated, the base pressure supplied thereto is supplied selectively to the pressure line 98 or the pressure line 99.

The base pressure supplied to the pressure line 98 is further supplied selectively to the pressure line 101 or the pressure line 102 under the control of the solenoid operated selector valve 100. The base pressure admitted to the pressure line 101 is supplied via the one-way check valve 103 to the port inducing the forward rotation of the air motor 62, causing the air motor 62 and thus socket 70 to rotate in the forward direction at a high speed. On the other hand, the base pressure admitted to the pressure line 102 is supplied to the pressure reduction valve 104 where the pressure reduction is effected and the reduced air pressure is supplied via the throttle valve 105 to the port inducing the reverse rotation of the air motor 62, causing the air motor 62 and thus the socket 70 to rotate in the positive direction at a low speed. The base pressure admitted to the pressure line 99 is subjected to pressure reduction at the pressure reduction valve 106 and supplied via the throttle valve 107 to the port inducing the reverse rotation of the air motor 62, causing the air motor 62 and thus the socket 70 to rotate in the reverse rotation at a low speed.

As previously described, the solenoid operated selector valve 95 controls action of the hand 32, while the solenoid operated selector valves 96, 97, and 100 control action of open end air wrench 61.

Figure 8:
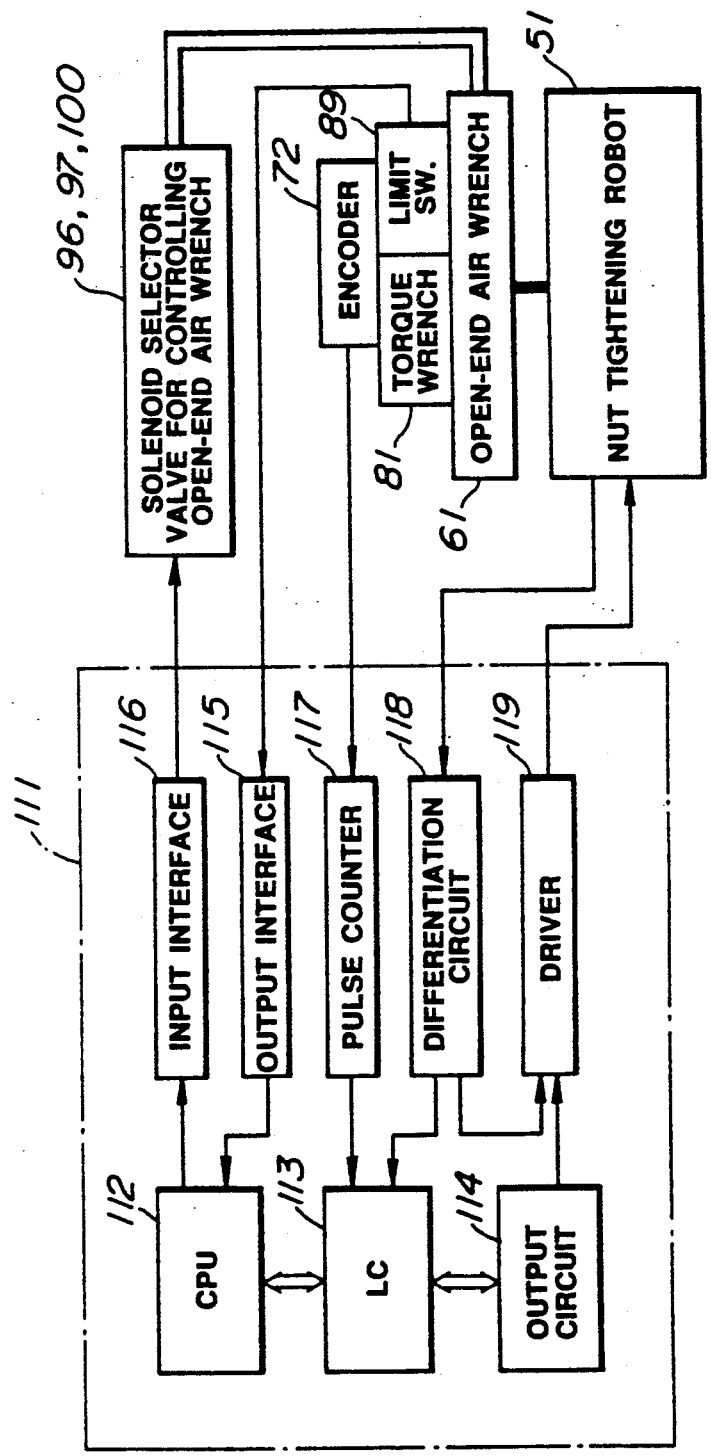
FIG. 8 is a block diagram of a control unit for the nut tightening robot.

The nut tightening robot 51 and open end air wrench 61 are controlled by the control unit 111 as shown in FIG. 8.

The control unit 111 comprises a central processor unit (CPU) 112, an arithmetic logic circuit (ALC), and an output circuit 114 including a digital analog converter, a signal input interface 115, a signal output interface 116, a pulse counter 117, a differential circuit 118, and a driver 119. The CPU 112 operates based on a control program stored in a memory and supplies the ALC 113 with output signals indicative of a path of movement of the hand of the nut tightening robot 51 and a velocity of the movement. It generates an output signal which is supplied via the output interface 116 to the solenoid operated selector valves 96, 97 and 100 for activating the open-end air wrench 61. It receives an output signal of the limit switch 89 via the signal input interface 115.

The ALC 113 calculates a target position of each of joints of the nut tightening robots 51 and a target velocity thereof in order for the hand of the nut tightening robot 51 to move along the path of movement given by the CPU 112 at the velocity given by the CPU 112. Via the digital analog conversion at the output circuit 114, the output signals of the ALC 113 indicative of the target position and velocity of each of the joints are supplied to the driver 119. The driver 119 activates motors for the joints of the nut tightening robot 51. An actual position indicative signal indicative of the actual position of each of the joints of the nut tightening robot 51 is fed via the differentiation circuit 118 to the ALC 113. In order to decrease a difference between the desired and actual position indicative signals, the ALC 113 modulates the target actual indicative signal supplied via the output circuit 114 to the driver 119.. The output signal of the encoder 72 mounted on the open-end air wrench 61 is supplied to the pulse counter 117 where the number of pulses is counted. The output signal of the pulse counter 117 is supplied to the ALC 113. Based on this output signal of the pulse counter 117, the ALC 113 calculates an angle of nut after the nut tightening operation has been completed. The result of this calculation is fed to the CPU 112.

The differentiation circuit 118 calculates the first derivative of the actual position indicative signal supplied thereto to give an actual velocity of each of the joints of the nut tightening robot 51. The output of the differentiation circuit 118 indicative of the actual velocity is supplied to the driver 119.

Figure 9:
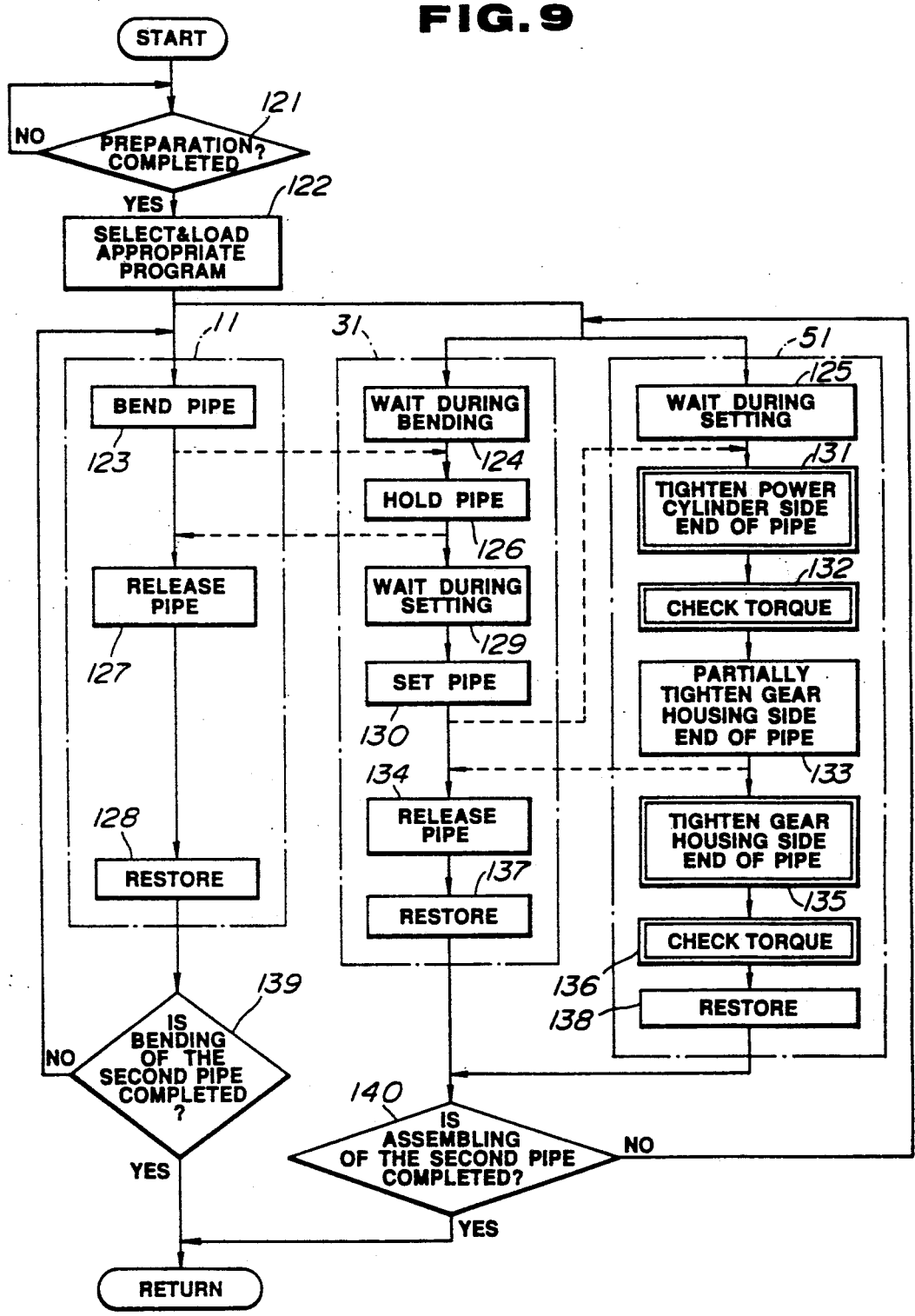
FIG. 9 is a flow diagram of a control program for activating the apparatus shown in FIG. 1.

The apparatus according to the present embodiment operates in accordance with the control program as illustrated in FIG. 9 to assemble two curved pipes 3 in manufacturing the power steering gear assemblies as shown in FIG. 11.

The execution of the control program shown in FIG. 9 is initiated upon receipt of production instruction of the power steering gear assembly. At a step 121, it is confirmed whether the preparation for assembling of the curved pipes has been completed or not. What are checked at this step 121 are whether the work, i.e., the gear housing 1 integral with the power cylinder 2, and whether the NC pipe bender 11 stays in the waiting state where the chuck 13 of the NC pipe bender 11 stays in the rest position. Then, the program proceeds to a step 122 if the preparation has been completed.

At the step 122, in accordance with the specification of the power steering gear assembly to be produced following the production instruction, appropriate control programs for the NC pipe bender 11, pipe set robot 31 and nut tightening robot 51 are selected and loaded. Specifically, the selection of the appropriate control programs is made in accordance with the length of the straight pipes 3, the curvature to be given to the pipe during the bending process, and the appropriate positions of the pipes 3 relative to the gear housing 1 integral with the power cylinder 2.

Then, the execution of the control programs is initiated. At a step 123, the NC pipe bender 11 has the pipe loader 21 to select the appropriate one out of four kinds of different, in length, straight pipes and operates to bend the straight pipe 3 supplied to the predetermined curved shape. In this bending process, the appropriate gear housing 1 is connected to the corresponding power cylinder 2, the pipe set robot 31 stays in its waiting position where it does not interfere with the bending process of the pipe 3, see step 124, and the nut tightening robot 51 stays in its waiting position where it does not interfere with the pipe set robot 31 operating to set the pipe 3, see step 125.

Upon completion of the bending process, the pipe set robot 31 let its hand 32 move to hold the pipe 3 held by the chuck 13 of the NC pipe bender 11, see a step 126. Subsequently, at steps 127 and 128, the chuck 13 releases the pipe 3 and returns to the rest position. Then, the pipe set robot 31 moves the pipe 3 to a waiting position where it does not interfere with the gear housing 1 with the poser cylinder 2 disposed on the pallet 41.

When the pallet 41 has reached a predetermined position, the program proceeds to a step 130 where the pipe set robot 31 set the pipe 3 at a predetermined position where the flare nuts 3a of the pipe 3 abut against the ports of the gear housing 1 and the power cylinder on the parallel 4 with the central axes of the flare nuts 3a arranged in alignment with the central axes of the ports of the gear housing 1 and power cylinder 2, respectively.

Thereafter, at steps 131 and 132, the nut tightening robot 51 tighten the flare nut 3a on the power cylinder 2 side of the pipe 3 with the open-end air wrench 61, and tighten its firmly with the torque wrench 81 to the predetermined torque. The nut tightening and the subsequent torque check are performed by executing the control program as shown in FIG. 10.

Figure 10:
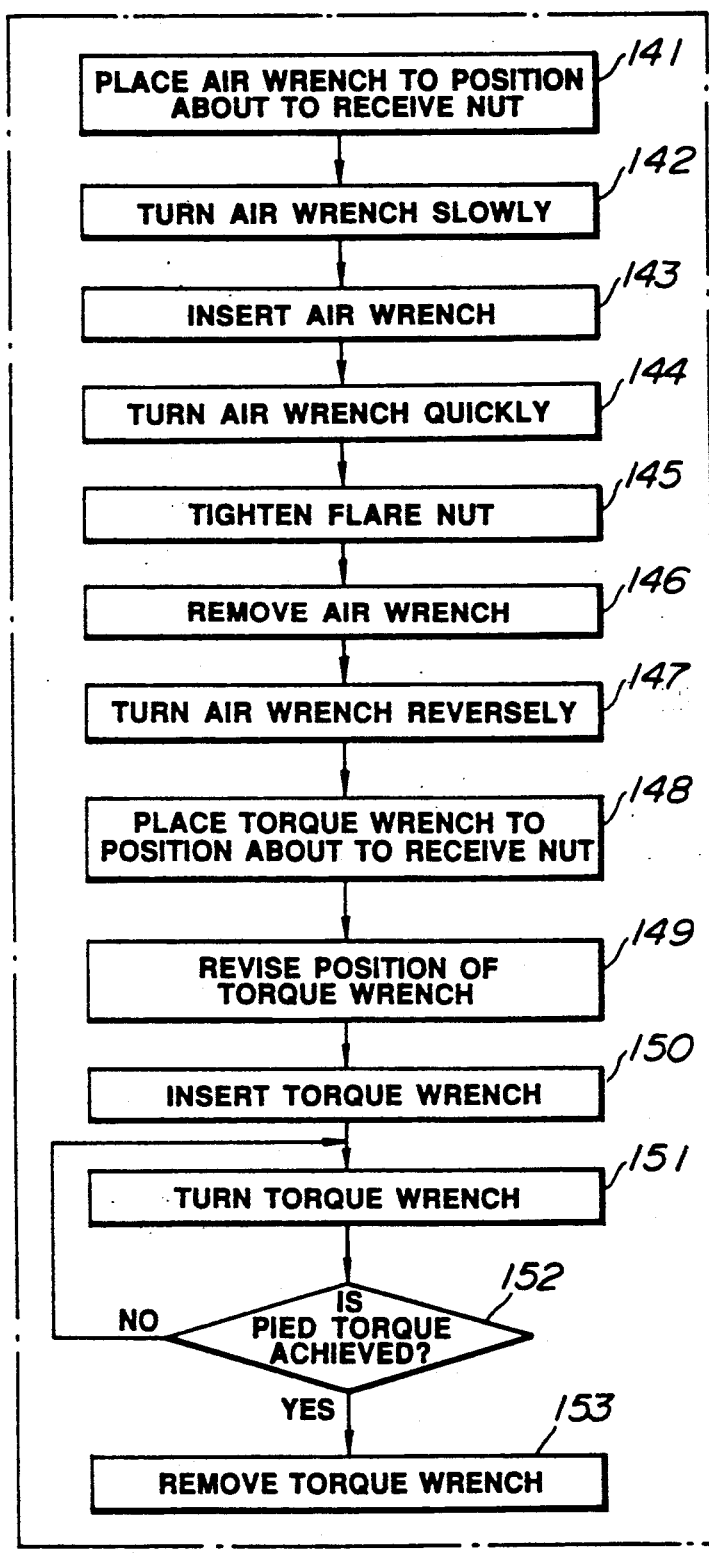
FIG. 10 is a flow diagram of a control program for tightening nut with the open end air wrench and the torque wrench.

Referring to FIG. 10, at a step 141, with the socket 70 held in the central rest position where the opening 70d faces forwardly toward the pipe 3, the open end air wrench 61 moves toward a position about to receive the nut 3a where the socket 70 receives therein the pipe 3 adjacent the nut 3a disposed near the power cylinder 2. Then, at a step 142, the air wrench 61 is caused to rotate at a low speed.

At the subsequent step 143, the open end air wrench 61 moves toward the power cylinder 2 until the socket 70 has the flare nut 3a to receive therein. Thereafter, at a step 144, the air wrench 61 starts rotating at a high speed. It keeps on rotating at the high speed for a predetermined period of time. This causes the flare nut 3a advance toward the power cylinder 2 until the flare nut 3a has a flared end portion of the pipe 3 interposed between it and the bottom wall of the port structure of the power cylinder 2, see FIG. 11(b).

After this tightening operation, the open end air wrench 61 is caused to step back from the power cylinder to disengage the socket 70 from the flare nut 3a at a step 146. The, at a step 147, the air wrench 70 is rotates in the reverse direction until the socket 70 takes the central rest position where the opening 70a faces forwardly. During this reverse rotation, the number of pulses generated by the rotary encoder 72 is counted. Using this result, an angle of rotation in the reverse direction till the socket 70 takes the central rest position is determined, and thus the direction along which two spaced opposed sides of the flare nut 3a extend upon completion of the tightening process is determined.

Then, the bracket 52 is rotated through 180 degrees and the torque wrench 81 is caused to advance toward the pipe 3 till a position about to receive the nut 3a where the head 83 of the torque wrench 81 receive the pipe 3 therein at a position adjacent the nut 3a. During this movement of the torque wrench toward the pipe 3, the angular position of the torque wrench 81 which is to take for the two opposed paralled sides 83a of the head 83 align with the two opposed sides of the flare nut 3a is calculated based on the result of counting the number of pulses generated by the encoder 72. Then, at a step 149, the position of the torque wrench 81 is revised to the position determined by the calculation.

Thereafter, at a step 150, the torque wrench 81 is caused to move toward the power cylinder 2 until the head 83 receives the flare nut 3a therein. At a step 151, the torque wrench 81 is rotated about the pipe 3 in the nut tightening direction, and if, at a step 152, it is determined that the output signal of the limit switch 89 is received and thus the predetermined torque has been achieved, the program proceeds to a step 153. At the step 153, the torque wrench 81 is caused to step back away from the power cylinder 2 to disengage the head 83 from the flare nut 3a.

After the tightening of and torque check of the flare nut 3a on the power cylinder 2 side have been completed, the program proceeds to a step 133 where the partial tightening of the flare nut 3a on the gear housing 5 side is carried out.

The partial tightening of the nut 3a is carried out in substantially the same manner as illustrated by the steps 141 to 145 except that instead of high speed rotation of the air wrench 61 at steps 144 and 145, the air wrench 61 is turned at a low speed for a relatively short period of time. With this operation, the flare nut 3a is temporarily engaged with the port on the gear housing 1. This is an effective measure not to impart big stress on the pipe 3 that is held by the pipe set robot 31, thus preventing deformation of the pipe 3. The program then proceeds to a step 134, the pipe set robot 31 is caused to release the pipe 3. After it is confirmed that the pipe set robot 31 has release the pipe 3, the program proceeds to steps 135 and 136 where the tightening of the flare nut 3a on the gear housing 1 side and the torque check are carried out in the same manner as illustrated in the flow chart in FIG. 10.

After releasing the pipe 3, the pipe set robot 31 returns to an intial rest position, see step 137. After the torque check at the step 136, the nut tightening robot 51 returns to its initial rest position, see step 138.

While the pipe set robot 31 sets the pipe 3 and the nut tightening robot 51 operates to tighten the flare nuts 3a, the NC pipe bender 11 performs beinding of the second pipe 3 repeating the steps 123 to 128 unless it is decided that the second pipe 3 has been subjected to the bending process.

If, at a step 140, it is decided that the second pipe 3 is not yet assembled, the pipe set robot 31 and the nut tightening robot 51 are caused to assemble the second pipe 3 to the gear housing 1 intergral with the power cylinder 2 by repeating the steps 126 to 138.

Figure 12:
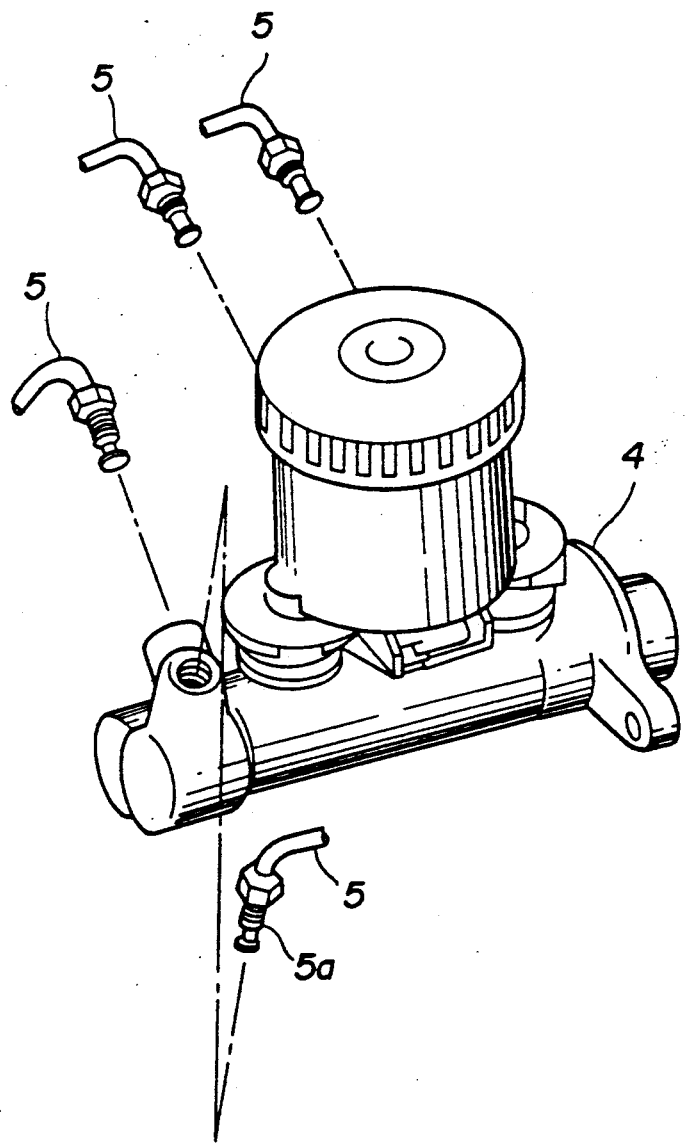
FIG. 12 is a perspective view of a master cylinder as another typical example of the products.

The present invention may be applied to assembling of pipes 5 with a brake master cylinder 4 as shown in FIG. 12 or assembling of a control rod with a carburetor.

From the preceding description, it will now be appreciated that according to the present invention a space for storing parts has been minimized since what are needed to store are elongate straight members like straight pipes or rods before being subjected to bending process. Besides, human error in selecting and assembling an inappropriate member has been eliminated.

What is claimed is:

1. An apparatus for assembling small numbers of a large variety of different products, comprising:
   means for delivering a work piece to a predetermined position, said work piece having connection means on an exterior portion thereof for receiving and connecting an end of an elongated member thereto;
   means for storing a variety of different straight elongated members, each of said elongated members having opposed ends;
   means for selecting a predetermined straight elongated member out of said variety of different straight elongated members in accordance with a production instruction;
   means for bending said predetermined straight elongated member in accordance with the production instruction to form a curved elongated member;
   means for receiving said curved elongated member and holding the same in a predetermined position adjacent to the exterior portion of said work piece; and
   means for connecting at least one end of said curved elongated member to said connection means on the exterior portion of said work piece, said means for externally attaching being unconnected to and separate from said curved elongated member and said work piece.

2. An apparatus for assembling small numbers of a large variety of different products according to claim 1, wherein said work piece is selected from the group consisting of power steering assemblies, master cylinder assemblies and carburetors.

3. An apparatus for assembling small numbers of a large variety of different products according to claim 1, wherein said connection means comprises a plurality of connection means and said means for attaching includes means for attaching each end of said curved elongated member to said connection means of said work piece.

4. An apparatus for assembling small numbers of a large variety of different products according to claim 1, wherein said elongated members are selected from the group consisting of pipes and rods.

5. An apparatus for assembling small numbers of a large variety of different products according to claim 4, wherein said elongated members comprise pipes with flared ends.

6. An apparatus for assembling small numbers of a large variety of different products according to claim 1, wherein each of said elongated members include connectors at each end thereof and said means for attaching comprises means for connecting at least one of said connectors of said curved elongated member to said connection means of said work piece.

7. An apparatus for assembling small numbers of a large variety of different products according to claim 6, wherein said elongated members comprise pipes having flared ends and said connectors and connection means comprise connectable threaded fittings.

8. An apparatus for assembling small numbers of a large variety of different products according to claim 7, wherein said means for attaching comprises means for checking the torque of the threaded connection between said work piece and said curved elongated member.

* * * * *